United States Patent
Gehrke

(10) Patent No.: US 8,264,806 B2
(45) Date of Patent: Sep. 11, 2012

(54) ELECTRONIC DEVICE INCLUDING A PROTECTION CIRCUIT FOR A LIGHT-EMITTING DEVICE

(75) Inventor: Dirk Gehrke, Freising (DE)

(73) Assignee: Texas Instruments Deutschland GmbH, Freising (DE)

(*) Notice: Subject to any disclaimer, the term of this patent is extended or adjusted under 35 U.S.C. 154(b) by 561 days.

(21) Appl. No.: 12/491,928

(22) Filed: Jun. 25, 2009

(65) Prior Publication Data

US 2009/0323238 A1 Dec. 31, 2009

Related U.S. Application Data

(60) Provisional application No. 61/141,438, filed on Dec. 30, 2008.

(30) Foreign Application Priority Data

Jun. 30, 2008 (DE) .................. 10 2008 031 029

(51) Int. Cl.
 *H02H 3/20* (2006.01)
 *H02H 9/04* (2006.01)
(52) U.S. Cl. ......................... 361/91.1; 361/56
(58) Field of Classification Search .............. 361/56, 361/91.1
See application file for complete search history.

(56) References Cited

U.S. PATENT DOCUMENTS

| 7,138,660 B2 * | 11/2006 | Ota et al. ............... 257/79 |
| 2007/0216602 A1 * | 9/2007 | Fujino ................. 345/44 |

FOREIGN PATENT DOCUMENTS

| DE | 69322484 T2 | 6/1999 |
| DE | 10254566 A1 | 6/2004 |
| DE | 102004007278 A1 | 10/2004 |
| DE | 102004056621 A1 | 2/2006 |
| DE | 102006056712 A1 | 6/2008 |
| WO | 03075423 A1 | 9/2003 |

OTHER PUBLICATIONS

Abstract for DE 10 2004 007 278 A1. Oct. 7, 2004.*

* cited by examiner

*Primary Examiner* — Rexford Barnie
*Assistant Examiner* — Christopher Clark
(74) *Attorney, Agent, or Firm* — William B. Kempler; Wade J. Brady, III; Frederick J. Telecky, Jr.

(57) ABSTRACT

An electronic device is provided that includes a protection circuit for a light-emitting device. The protection circuit comprises a first node adapted to be coupled to an anode of the light-emitting device and a second node adapted to be coupled to a cathode of the light-emitting device. A voltage detection stage is coupled between the first and second nodes. The voltage detection stage is adapted to detect an overvoltage condition between the first and second nodes. Furthermore, the protection circuit comprises a thyristor coupled with its anode to the first node, its cathode to the second node to the voltage detection stage. When the overvoltage condition is detected in normal operation the thyristor is controlled to open so that the current can flow through the thyristor.

18 Claims, 2 Drawing Sheets

ELECTRONIC DEVICE INCLUDING A PROTECTION CIRCUIT FOR A LIGHT-EMITTING DEVICE

CROSS-REFERENCE TO RELATED APPLICATIONS

This patent application claims priority from German Patent Application No. 10 2008 031 029.8, filed 30 Jun. 2008, and from U.S. Provisional Patent Application No. 61/141,438, filed 30 Dec. 2008, the entireties of which are incorporated herein by reference.

FIELD OF THE INVENTION

The invention generally relates to an electronic device including a protection circuit for a light-emitting device.

BACKGROUND

In many applications, light-emitting devices, for example light-emitting diodes (LEDs), are driven in a string; i.e., so that many LEDs are connected in series with each other. However, if one LED in the series-connected string of LEDs should fail, this can create an open circuit condition in which the whole LED string will then be out of operation. Time is then lost while the failed LED is detected and repaired. This is extremely inconvenient and can be dangerous when the LED string is used in applications where safety is an issue, for example, in street lighting or emergency lighting, etc. In high brightness LEDs, which are often used in these applications like street lighting, solid state lighting and emergency lighting, for example, which are intended to have low maintenance costs and a long lifetime, this situation is extremely undesirable. Other applications that are less critical, but where LED failure has an impact, are LED backlights for liquid crystal display (LCD) televisions and monitors, which are moving away from cold cathode fluorescent lamp (CCFL) backlights to LED backlights.

LEDs can be subject to failure due to an electrostatic discharge (ESD), which leads to an overvoltage condition. Operating outside its normal or ambient voltage range then causes damage to the LED. Solutions for protecting LEDs from ESD exist, which use a single diode connected in an anti-parallel configuration to the LED within the same package. This can give the LED protection against electrostatic discharges of up to 2 kV. However, although this solution offers protection to the LED in the event of an ESD, it does not prevent the loss of operation of a whole string of LEDs in the case of failure of just one LED in the string. Therefore, should the LED fail for any reason, there will still be an interruption to operation and associated costs while the failed LED in the series-connected string of LEDs is detected and replaced.

SUMMARY

Accordingly, one aspect of the invention provides an electronic device including a protection circuit for a light-emitting device. The protection circuit comprises a first node adapted to be coupled to an anode of the light-emitting device. A second node is adapted to be coupled to a cathode of the light-emitting device and a voltage detection stage is coupled between the first and second nodes. The voltage detection stage is adapted to detect an overvoltage condition between the first and second nodes. Furthermore, the protection circuit comprises a thyristor (also known as a silicon controlled rectifier (SCR)) coupled with its anode to the first node, its cathode to the second node and to the voltage detection stage. When an overvoltage condition is detected (e.g. in normal operation), the control gate of the thyristor is triggered so that current can flow through the thyristor.

When a light-emitting device in a string of series-connected light-emitting devices fails, the entire power supply voltage, for example 20 V, which was dropped across the whole string of devices, is dropped across the single failed light-emitting device, leading to an overvoltage condition (an instantaneous sharp peak in the voltage dropped across the light-emitting device). If such an overvoltage condition is detected by the voltage detection stage, the voltage at the control gate of the thyristor is increased and the control gate of the thyristor receives a voltage or current pulse. This triggers or latches the thyristor into conduction so that it is forward biased from its anode to its cathode. Excess current caused by the overvoltage condition is then allowed to flow through the thyristor, thus bypassing the light-emitting device. In other words, the failed or broken light-emitting device is shorted and, when the light-emitting device is series-connected to a string of other light-emitting devices, the whole light-emitting device string will stay in operation. This provides the advantage that there is no interruption of operation to the light-emitting device string and therefore no maintenance time or cost is wasted. The invention also provides a means of keeping a string of series-connected light-emitting devices in operation without the need for any additional complex external circuitry. This is especially advantageous for products in which the light-emitting device string is required to have a long lifetime and low maintenance costs, and/or where safety is an issue, such as when the light-emitting device string is used for an application like street lighting or emergency lighting. Furthermore, with the electronic device according to the invention, it is possible to series couple many light-emitting devices together in a very long chain, rather than having multiple parallel strings of light-emitting devices, since there is no risk of the entire chain of devices failing when just one device in the chain fails.

Advantageously, the device may be provided with a reporting (signal out) pin, which indicates if the thyristor is latched (fired). In this way it is possible to determine whether the thyristor is latched and therefore if the light-emitting device is being bypassed. In this way a reporting of the condition of the device is possible.

The voltage detection stage may include a series arrangement of a diode and a resistor coupled in parallel with the thyristor. In this case, the diode and the resistor can be connected together in series between the first and second nodes. The diode can be coupled with its cathode to the input node and then a node interconnecting the anode of the diode and the resistor can be coupled to a control gate of the thyristor. This means that the diode is coupled anti-parallel to the light-emitting device and provides a very inexpensive solution for the voltage detection stage, which detects an overvoltage condition when the light-emitting device fails. Since the diode is reverse biased with respect to the light-emitting device, when an overvoltage condition occurs; i.e., the voltage across the light-emitting device between the anode and the cathode is above the allowed range of operating voltages of the light-emitting device, current is allowed to flow in the reverse direction through the diode. This causes a current or voltage pulse to the control gate of the thyristor, which latches the thyristor and allows the current to flow through it in a direction from the first node to the second node (from the anode to the cathode of the thyristor), thus bypassing or short circuiting the light-emitting device.

The diode in the voltage detection stage may be implemented as Zener diode. If the Zener diode is chosen such that its breakdown voltage (Zener voltage) is made equal to the voltage between the anode and the cathode (the voltage across the light-emitting device) at the overvoltage condition, current will flow in the reverse direction of the Zener diode when the overvoltage condition is reached. This causes the control gate of the thyristor to trigger the thyristor. The current path of the thyristor is then made conductive so that current can flow through the thyristor from the first node to the second node so as to short-circuit or bypass the light-emitting device. Since current can only bypass the light-emitting device when the voltage across the light-emitting device exceeds the breakdown voltage of the Zener diode, the protection circuit cannot be falsely triggered. In other words, the light-emitting device will only be short-circuited by the protection circuit when the overvoltage condition is reached.

In an alternative embodiment of the invention, the thyristor may be implemented as two transistors, i.e. a PNP and an NPN bipolar transistor. The diode in the voltage detection stage may still be implemented as Zener diode and the Zener diode may be coupled between the bases of the two transistors. One or more resistors may be coupled in series to the Zener diode. The thyristor consisting of the two bipolar transistors is then made conductive if the breakdown voltage of the Zener diode is reached, which means that the overvoltage condition is reached. The current path of the thyristor is then made conductive so that current can flow through the two bipolar transistors, i.e., through the thyristor from the first node to the second node, so as to short-circuit or bypass the light-emitting device.

Alternatively, the voltage detection stage may include a thermistor coupled between the first and second nodes. The thermistor can then be adapted to provide a voltage that changes with temperature at the control gate of the thyristor. The thermistor may be a resistor having either a positive temperature coefficient or a negative temperature coefficient. In the case where the thermistor has a positive temperature coefficient, the voltage across the resistor increases as a function of increasing temperature. However, the thermistor may also be implemented as a resistor having a negative temperature coefficient, which means that the voltage across the resistor decreases with increasing temperature.

The voltage detection stage may also include a comparing means adapted to receive a voltage drop across the thermistor at its input and having its output coupled to the control gate of the thyristor. This means that, if the temperature of the light-emitting device should increase so that it is outside the ambient operating range, the voltage drop across the thermistor will increase or decrease (depending on whether the thermistor has a positive or a negative temperature coefficient, respectively), which causes the output of the comparing means to go high. Therefore, since the control gate of the thyristor is coupled to the output of the comparing means, the control gate of the thyristor is triggered to make the thyristor conductive and current is allowed to flow through the thyristor in a direction from the first node to the second node, thus bypassing the light-emitting device. The device will then be short circuited before it fails due to overheating. This provides the advantage the light-emitting device may safely operate at a higher ambient temperature, since it is automatically bypassed when its operating temperature increases outside the allowed temperature range.

In addition, the light-emitting device could go back to operation once the thermistor has cooled down to within the ambient temperature range. This functionality could be implemented, for example, by use of a hysteresis. Furthermore, the device could be provided with a signal out (reporting) pin, which could be used to determine whether the thyristor is latched (fired). This way, a reporting of the over temperature of the light-emitting device is possible.

Advantageously, the electronic device further comprises an additional diode coupled in parallel with the thyristor with its anode to the second node and its cathode connected to the first node. In other words the additional diode is coupled in an anti-parallel manner with the thyristor and the light-emitting device. This additional diode is configured to protect the light-emitting device from electrostatic discharge (ESD). Therefore, in the event of an electrostatic discharge, for example up to 2 kV, current will flow in the reverse direction of the diode, thus short circuiting the light-emitting device and protecting it from the overvoltage condition caused by the electrostatic discharge.

The electronic device according to the invention may be implemented in a light-emitting device package. This light-emitting device package then may comprise a light-emitting device coupled to the electronic device of the present invention such that the anode of the light-emitting device is coupled to the first node and the cathode of the light-emitting device is coupled to the second node. In this light-emitting device package, the light-emitting device may be provided on a first die and the electronic device may be provided on a second die separate from the first die. Partitioning the device package so that the light-emitting device is provided on one die and the protection circuit in the device of the present invention is provided on another, separate die provides the advantage of a device package that is very flexible and existing designs may be easily adapted. Furthermore, providing the protection circuit on a separate die from the light-emitting device means that it is possible to form device packages including the device of the invention with any different type of light-emitting device. In addition, providing the device according to the invention on a separate die from the light-emitting device means that any heat generated by the light-emitting device is not applied to the protection circuit and thus does not interfere with the operation of the protection circuit.

BRIEF DESCRIPTION OF THE DRAWINGS

Further advantages and characteristics of the invention ensue from the description below of the preferred embodiments, with reference to the accompanying drawings, in which.

DETAILED DESCRIPTION OF EXAMPLE EMBODIMENTS

Figure 1:
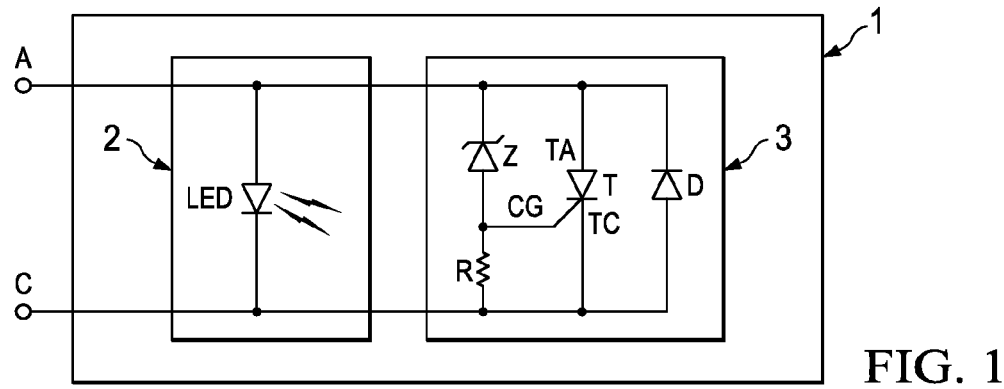
FIG. 1 is a simplified circuit diagram of a device package including an electronic device with a protection circuit for a light-emitting device according to a first embodiment of the invention.

FIG. 1 shows a simplified circuit diagram of a device package including an electronic device having a protection circuit for a light-emitting device according to a first embodiment. A device package 1 includes two dies; a first die 2 with a light-emitting device LED and a second die 3 having protection circuitry provided thereon for protecting the light-emitting device LED. The light-emitting device LED is coupled between an anode A and a cathode C, with its anode connected to the anode A and its cathode connected to the cathode C. The protection circuit provided on the separate die 3 has a Zener diode Z with its cathode coupled to the anode A and its anode coupled to a resistor R, with the resistor R also being coupled to the cathode C. The Zener diode Z and the resistor R are connected together in series, with a node interconnecting the Zener diode Z and the resistor R being connected to the control gate CG of a thyristor T. The thyristor T is coupled between the anode A and the cathode C with its anode TA to the anode A and its cathode TC to the cathode C. A diode D is connected in an anti-parallel configuration to the thyristor T with its cathode to the anode A and its anode to the cathode C.

If the light-emitting device LED should fail, this causes a voltage surge or peak; i.e., a sudden instantaneous increase in voltage, between the anode A and the cathode C, in other words an overvoltage condition. The Zener diode Z is chosen so that its breakdown voltage is equal to a predetermined voltage at which an overvoltage condition occurs.

Therefore, if the voltage across the LED between the anode A and the cathode C at the overvoltage condition is greater than the breakdown voltage of the Zener diode Z (the Zener voltage), current flows in a reverse direction through the Zener diode Z from its cathode to its anode and the voltage at the control gate of the thyristor therefore increases (there is a current pulse or a voltage pulse to the control gate of the thyristor T). The control gate of the thyristor T is then triggered to make the channel of the thyristor T conductive and the thyristor T is latched so that current flows through the thyristor T in a direction from the anode A to the cathode C, thereby short circuiting the light-emitting device LED. This means that, in the event the light-emitting device LED is connected in series with a string of other light-emitting devices, the other light-emitting devices will continue to operate since current flowing through the thyristor T bypasses the open circuit condition of the failed light-emitting device LED. Even if there is no longer a voltage or current applied to the control gate of the thyristor T, the thyristor T will still remain conducting so as to short circuit the LED. In other words, the thyristor T remains latched in its ON state, even after the instantaneous voltage pulse to its control gate CG caused by the overvoltage condition. As long as its anode TA remains positively biased it cannot be switched off until the anode current falls below the holding current specified by the manufacturer. However, the thyristor T may be switched off if the external circuit causes its anode TA to become negatively biased.

Furthermore, in the event that there should be a voltage surge due to electrostatic discharge (ESD), the diode D protects the LED from the ESD for an ESD of up to 2 kV. This is because the breakdown voltage of the diode D is chosen so that when the voltage across the LED due to the ESD increases above the breakdown voltage of the diode D, current flows through the diode D in its reverse direction from its cathode to its anode, thereby bypassing the light-emitting device LED and protecting it from the excess current due to the ESD.

Figure 2:
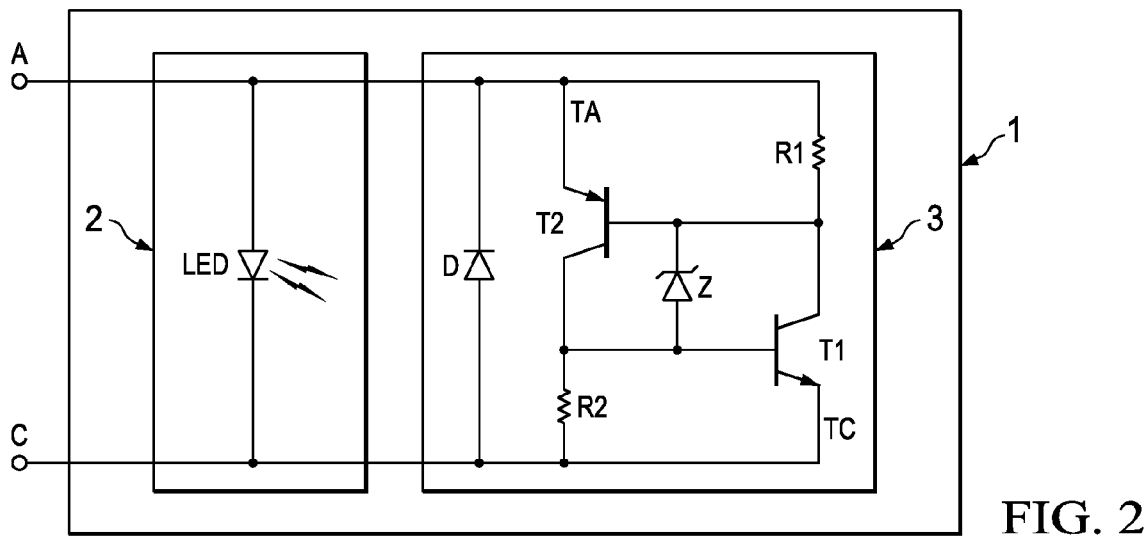
FIG. 2 is a simplified circuit diagram of a device package including an electronic device with a protection circuit for a light-emitting device according to another embodiment of the invention.

FIG. 2 shows a simplified circuit diagram of another embodiment of the invention. The thyristor T (silicon controlled rectifier) may be implemented by a pair of coupled bipolar junction transistors T1 and T2. The transistor T1 is an NPN transistor and the transistor T2 is a PNP transistor coupled with the base of T1 to the collector of T2 and the base of T2 to the collector of T1. The emitter of T2 corresponds to thyristor anode TA shown in FIG. 1 and the emitter of T1 corresponds to thyristor cathode TA shown in FIG. 1. The Zener diode Z is coupled between the base terminals of T1 and T2, with a resistor R1 coupled between the collector terminal of T1 and the anode A and a resistor R2 coupled between the collector terminal of T2 and the cathode C. The trigger voltage and triggered on voltage of the silicon controlled rectifier implemented by the transistors T1 and T2 can be calculated according to the following. The values are given by way of example only.

Trigger voltage(voltage at which the thyristor or silicon controlled rectifier is latched)=Zener voltage+$V_{BE}(T1)$+$V_{BE}(T2)$, where Zener voltage is the breakdown voltage of the Zener diode Z, $V_{BE}$ (T1) is the base-emitter voltage of the transistor T1 and $V_{BE}$ (T2) is the base-emitter voltage of the transistor T2.

For example, with a Zener voltage of 6.5 V and a base emitter voltage $V_{BE}$ for both transistors T1 and T2 of 0.7 V, Trigger voltage=6.5 V+0.7 V+0.7 V=7.9 V, and Triggered on voltage=(Ion×$R1$)+$V_{CE}$ where Ion is the current through the thyristor arrangement when it is latched, R1 is the resistance of the resistor R1 and $V_{CE}$ is the collector-emitter voltage of the transistor T1.

For example, with Ion=750 mA, R1=2Ω and 0.2 V≦$V_{CE}$≦0.4 V, then

Triggered on voltage=(750 mA×2Ω)+(0.2 V≦$V_{CE}$≦0.4 V)=1.7 V to 1.9 V.

Figure 3:
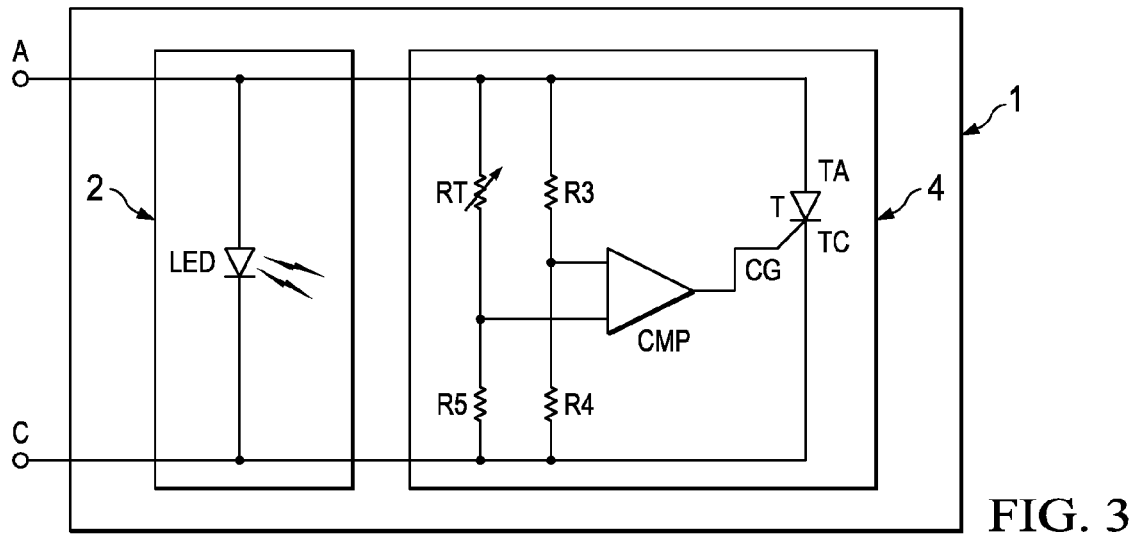
FIG. 3 is a simplified circuit diagram of a device package including an electronic device with a protection circuit for a light-emitting device according to another embodiment of the invention.

FIG. 3 shows a further alternative embodiment of an electronic device implemented in a light-emitting device package 1.

The circuit is similar to that described with reference to the first embodiment and the same elements will be denoted with the same reference signs. The device package 1 also comprises a light-emitting device LED provided on a die 2 connected between an anode A and a cathode C with its anode to the anode A and its cathode to the cathode C. However, the protection circuit according to this embodiment has a different configuration to that of the first embodiment described above and is provided on another die 4, separate from the die 2.

In this embodiment, a thyristor T is also connected with its anode TA to the anode A and its cathode TC to the cathode C, such that it is coupled in parallel with the light-emitting device LED when the dies 2 and 4 are coupled. However, this embodiment differs from the first embodiment in that the control gate CG of the thyristor T is connected to the output of a comparator CMP. A series arrangement of resistors R3 and R4 is coupled between the anode A and the cathode C and a node interconnecting the resistors R3 and R4 is connected to a first input of the comparator CMP. A series arrangement of a thermistor RT and a resistor R5 is also connected between the anode A and the cathode C in parallel with the resistor arrangement R3 and R4. A node interconnecting the thermistor RT and the resistor R5 is connected to a second input of the comparator CMP. The thermistor RT may preferably have a positive temperature coefficient, such that the voltage across it increases as a function of increasing temperature. However, alternatively, in a modified circuit a thermistor having a negative temperature coefficient, such that the voltage across it decreases as a function of increasing temperature, may be used.

The temperature coefficient of the thermistor RT (either positive or negative) and the resistance values of the resistors R3, R4 and R5 are chosen such that, when the LED is operating in its normal ambient temperature range, the voltages at the first and second inputs of the comparator CMP are equal so that the output of the comparator is low, for example. However, if the light-emitting device LED becomes too hot; i.e., its temperature increases above its ambient operating temperature, then the voltage across the thermistor RT increases (in the case where it has a positive temperature coefficient) or decreases (in the case where it has a negative temperature coefficient). This means that there is a difference between the voltages at the first and second inputs of the comparator CMP, which causes a voltage increase at the output of the comparator CMP. This increases the voltage at the control gate CG of the thyristor T, which prompts the control gate of the thyristor T to open the thyristor T so that current then flows through the thyristor T in a direction from the anode A to the cathode C. This causes the light-emitting device LED to be bypassed or short-circuited and it is allowed to cool down. As the temperature of the LED decreases, the voltage across the thermistor RT decreases (if the thermistor RT has a positive temperature coefficient) or increases (if the thermistor RT has a negative temperature coefficient). Therefore, eventually the voltages at both inputs of the comparator CMP become equal, when the LED returns to its ambient operating temperature, and the output of the comparator CMP is low, for example. However, the current conducting path of the thyristor T remains open and current will still flow through the thyristor T, short-circuiting the light-emitting device LED, until either power to the thyristor T is switched off or the thyristor T is reverse biased. The LED may therefore safely operate at the upper end of its ambient operating temperature range, since the protection circuit according to the present embodiment automatically allows the LED to be bypassed, should its temperature increase so as to be outside the ambient operating range.

Figure 4:
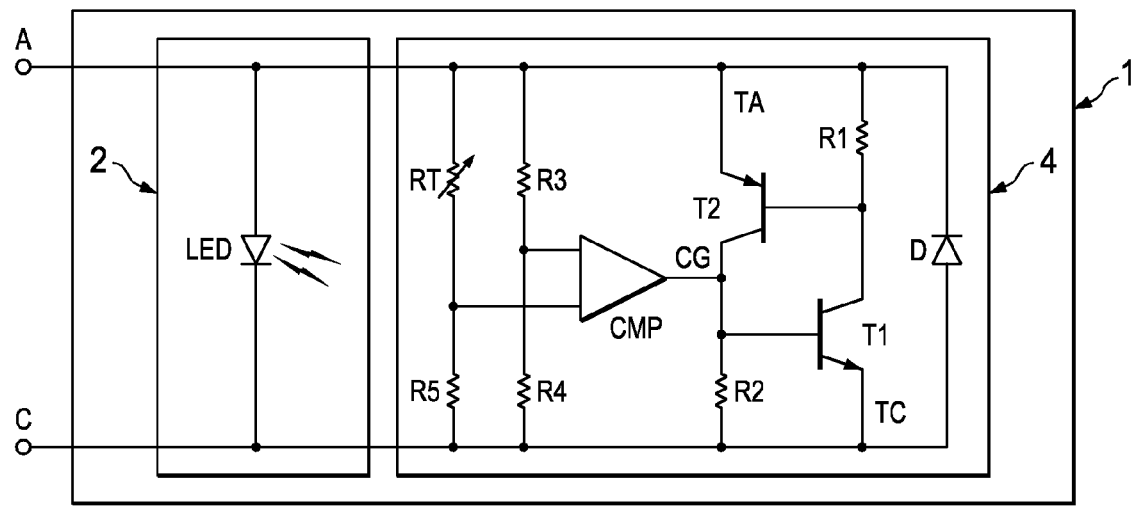
FIG. 4 is a more detailed circuit diagram of a device package including an electronic device with a protection circuit for a light-emitting device according to another embodiment of the invention.

FIG. 4 shows the protection circuit of FIG. 3 provided on the die 4 in more detail, with the thyristor T, or silicon controlled rectifier, being implemented by NPN and PNP bipolar transistors T1 and T2, respectively, as well as the resistor arrangement of R1 and R2, as shown in FIG. 2. The arrangement of resistors R3, R4, R5 and RT, and the comparator CMP is the same as that shown in FIG. 4. The operation of the circuit shown in FIG. 4 is the same as that described above with reference to FIG. 3.

In an alternative embodiment, the protection circuits provided on the die 4, and shown in FIGS. 3 and 4, for short-circuiting or bypassing the light-emitting device LED in the event that its temperature increases above the ambient operating range, could also be implemented with a hysteresis. In this way, once the light-emitting device LED has cooled down again to a specific temperature within its ambient operating range, the protection circuitry can be switched off so that if the LED is operated with pulsating DC, for example, the thyristor will turn off and the LED will no longer be bypassed and can start operating again. Then the light-emitting device LED can be operated in a dedicated temperature range without the risk of damaging it while it is being operated at high temperatures. In addition, if a string of light-emitting devices are bypassed at increasing temperature, less heat will be dissipated, allowing the whole system to cool down. This way, the light-emitting devices can come back into operation one by one. Therefore the whole system can become more reliable in the case of an overtemperature condition.

Figure 5:
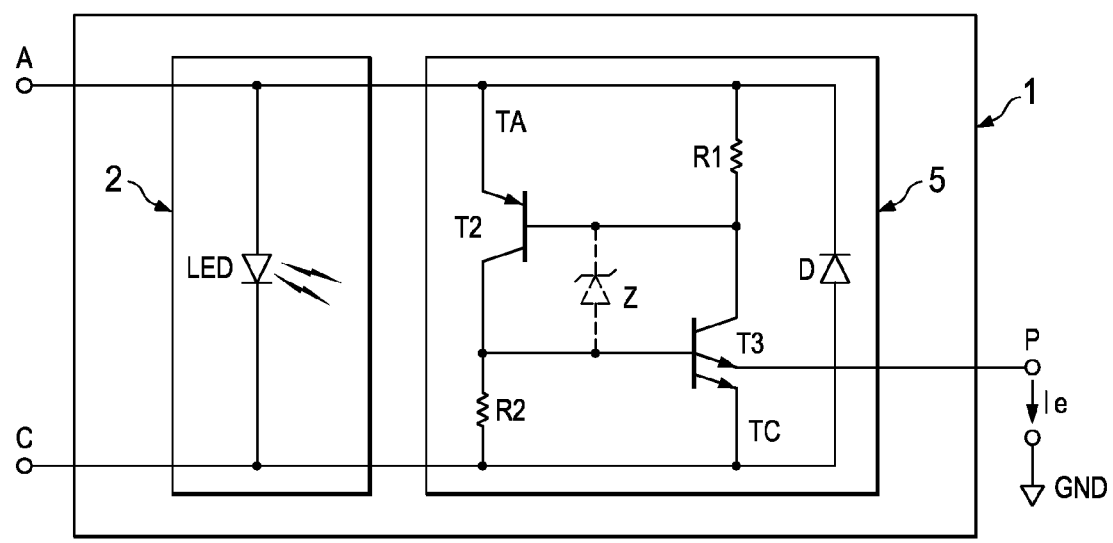
FIG. 5 is a simplified circuit diagram of a device package including an electronic device with a protection circuit for a light-emitting device according to another embodiment of the invention.

FIG. 5 shows a further embodiment with a different example of an electronic device 1 having a first die 2, on which a light-emitting device LED is provided, and a protection circuit provided on a second die 5. Again, the second die 5 is separate from the first die 2. In this case, a thyristor, or silicon controlled rectifier arrangement is implemented by a PNP transistor T2 and an NPN transistor T3 having a double emitter structure. One of the emitter terminals of the transistor T3 is coupled to a reporting pin P. The level of the emitter current Ie at the reporting pin P can then indicate the condition of the thyristor (silicon controlled rectifier); i.e., whether or not it is latched. The base of the transistor T2 is coupled to the collector of the transistor T3 and the base of the transistor T3 is coupled to the collector of the transistor T2. The emitter of the transistor T2 is coupled to the anode A and the other emitter of the transistor T3 that is not coupled to the reporting pin P is coupled to the cathode C. A resistor R1 is coupled between the anode A and an interconnection of the base and collector of the transistor T2 and the transistor T3. A resistor R2 is coupled between the cathode C and an interconnection of the base and collector of the transistor T3 and the transistor T2. A diode D is coupled in parallel with the silicon controlled rectifier arrangement with its anode to the cathode C and its cathode to the anode A.

The protection circuit provided on the second die 5 may either have a voltage detection stage implemented with a Zener diode coupled between the base terminals of the transistors T2 and T3, as shown in FIG. 2, or with the thermistor and comparator arrangement shown in FIG. 4. In both cases, when an overvoltage condition occurs in the light-emitting device LED, the thyristor or silicon controlled rectifier arrangement is latched and the LED is short circuited or bypassed so that current flows through the thyristor arrangement. Current Ie from the emitter of the transistor T3 coupled to the reporting pin P then flows to the reporting pin P, which indicates that the thryristor arrangement is latched and thus that the light-emitting device LED has failed. The current Ie at the reporting pin P can be a percentage, for example 1% or 2%, of the current in the thyristor or silicon controlled rectifier arrangement when it is latched or fired-up. The latched or fired-up current of the thyristor can be, for example, 350 mA or 750 mA, depending on the application requirements of the device, as well as device layout. If the thyristor is not latched, there will be no current out of the reporting pin P, therefore this condition indicates that the LED is operational and not being short-circuited by the protection circuitry. Information about the current Ie at the reporting pin can be used to generate a true/false logic at a desired voltage level. Such a current Ie at the reporting pin P can be indicated, for example, by means of a visual indicator such as a lamp. The reporting pin P can also indicate when the temperature of the LED has increased outside the ambient operating range.

Although the invention has been described hereinabove with reference to specific embodiments, it is not limited to these embodiments and no doubt further alternatives will occur to the skilled person that lie within the scope of the invention as claimed.

For example, in the above-described embodiments of the present invention, the light-emitting device is a light-emitting diode (LED). However, this is for illustrative purposes only and the device of the present invention may be used in conjunction with any kind of light-emitting device, for example a semiconductor laser. Furthermore, the protection circuits of the embodiments shown in FIGS. 2, 4 and 5 may be used in conjunction with each other, all three embodiments together, or, alternatively, the embodiments shown in FIGS. 2 and 5 or in FIGS. 4 and 5 may respectively be employed together in one protection circuit.

The invention claimed is:

1. An electronic device including a protection circuit for a light-emitting device, the protection circuit comprising:
    a first node adapted to be coupled to an anode of the light-emitting device;
    a second node adapted to be coupled to a cathode of the light-emitting device;
    a voltage detection stage coupled between the first and second nodes, the voltage detection stage being adapted to detect an overvoltage condition between the first and second nodes; and
    a thyristor coupled with its anode to the first node, its cathode to the second node and to the voltage detection stage such that when the overvoltage condition is detected the thyristor is triggered to conduct so that current can flow through the thyristor, wherein the thyristor comprises a PNP transistor and an NPN transistor having a double emitter, one of the emitters of the NPN transistor being coupled to a reporting pin to indicate a condition of the thyristor.

2. The electronic device according to claim 1, wherein the voltage detection stage includes a series arrangement of a diode and a resistor coupled in parallel with the thyristor.

3. The electronic device according to claim 2, wherein the diode is coupled with its cathode to the first node and a node interconnecting the anode of the diode and the resistor is coupled to a control gate of the thyristor.

4. The electronic device according to claim 2, wherein the diode is a Zener diode.

5. The electronic device according to claim 1 wherein the voltage detection stage includes a thermistor coupled between the first and second nodes and adapted to provide a voltage that changes with temperature at a control gate of the thyristor.

6. The electronic device according to claim 5, wherein the voltage detection stage includes a comparing means adapted to receive a voltage drop across the thermistor at its input and having its output coupled to the control gate of the thyristor.

7. The electronic device according to claim 1, further comprising an additional diode for protecting the light-emitting device from electrostatic discharge, the additional diode being coupled in parallel with the thyristor with its anode to the second node and its cathode to the first node.

8. A light-emitting device including an electronic device having a protection circuit for the light-emitting device, comprising:
    a light-emitting device;
    a first node coupled to an anode of the light-emitting device;
    a second node coupled to a cathode of the light-emitting device;
    a voltage detection stage coupled between the first and second nodes, the voltage detection stage being adapted to detect an overvoltage condition between the first and second nodes; and
    a thyristor coupled with its anode to the first node, its cathode to the second node and to the voltage detection stage such that when the overvoltage condition is detected the thyristor is triggered to conduct so that current can flow through the thyristor, wherein the thyristor comprises a PNP transistor and an NPN transistor having a double emitter, one of the emitters of the NPN transistor being coupled to a reporting pin to indicate a condition of the thyristor.

9. The light-emitting device package according to claim 8, wherein the light-emitting device is provided on a first die and the electronic device is provided on a second die separate from the first die.

10. The light-emitting device according to claim 8, wherein the voltage detection stage includes a series arrangement of a diode and a resistor coupled in parallel with the thyristor.

11. The light-emitting device according to claim 10, wherein the diode is coupled with its cathode to the first node and a node interconnecting the anode of the diode and the resistor is coupled to a control gate of the thyristor.

12. The light-emitting device according to claim 10, wherein the diode is a Zener diode.

13. The electronic device according to claim 2, further comprising an additional diode for protecting the light-emitting device from electrostatic discharge, the additional diode being coupled in parallel with the thyristor with its anode to the second node and its cathode to the first node.

14. The electronic device according to claim 3, further comprising an additional diode for protecting the light-emitting device from electrostatic discharge, the additional diode being coupled in parallel with the thyristor with its anode to the second node and its cathode to the first node.

15. The electronic device according to claim 4, further comprising an additional diode for protecting the light-emitting device from electrostatic discharge, the additional diode being coupled in parallel with the thyristor with its anode to the second node and its cathode to the first node.

16. The electronic device according to claim 5, further comprising an additional diode for protecting the light-emitting device from electrostatic discharge, the additional diode being coupled in parallel with the thyristor with its anode to the second node and its cathode to the first node.

17. The electronic device according to claim 6, further comprising an additional diode for protecting the light-emitting device from electrostatic discharge, the additional diode being coupled in parallel with the thyristor with its anode to the second node and its cathode to the first node.

18. The light-emitting device according to claim 8, wherein the voltage detection stage includes a thermistor coupled between the first and second nodes and adapted to provide a voltage that changes with temperature at a control gate of the thyristor.

* * * * *